United States Patent
Podstawa et al.

(10) Patent No.: US 10,822,506 B2
(45) Date of Patent: Nov. 3, 2020

(54) METHODS AND FORMULATIONS FOR PAINT DEPOSIT REMOVAL

(71) Applicants: Michael Podstawa, Jacksonville, FL (US); Jerry Russell May, Jacksonville, FL (US)

(72) Inventors: Michael Podstawa, Jacksonville, FL (US); Jerry Russell May, Jacksonville, FL (US)

(*) Notice: Subject to any disclaimer, the term of this patent is extended or adjusted under 35 U.S.C. 154(b) by 0 days.

(21) Appl. No.: 16/821,237

(22) Filed: Mar. 17, 2020

(65) Prior Publication Data

US 2020/0299528 A1 Sep. 24, 2020

Related U.S. Application Data

(60) Provisional application No. 62/820,936, filed on Mar. 20, 2019.

(51) Int. Cl.
  *C09D 9/04* (2006.01)
  *C09D 9/02* (2006.01)
  *C09D 7/80* (2018.01)
(52) U.S. Cl.
  CPC .............. *C09D 9/04* (2013.01); *C09D 9/02* (2013.01)

(58) Field of Classification Search
  CPC .................................. C09D 7/80; C09D 9/04
  See application file for complete search history.

(56) References Cited

U.S. PATENT DOCUMENTS

| | | | | |
|---|---|---|---|---|
| 5,679,067 A | * | 10/1997 | Johnson | A46B 3/005 451/527 |
| 6,562,474 B1 | * | 5/2003 | Yoshimi | B05D 5/00 428/472.3 |
| 10,479,957 B2 | * | 11/2019 | Roelofs | C10M 173/02 |
| 2005/0003970 A1 | * | 1/2005 | Ohmura | C10M 169/06 508/365 |
| 2012/0156052 A1 | * | 6/2012 | Richards | C09D 5/1668 416/241 R |
| 2014/0314730 A1 | * | 10/2014 | Comanor | A61K 31/201 424/94.1 |

* cited by examiner

*Primary Examiner* — Mark Eashoo
*Assistant Examiner* — M. Reza Asdjodi
(74) *Attorney, Agent, or Firm* — Rogers Towers, P.A.; Joseph P. Kincart

(57) ABSTRACT

The present disclosure provides for preparing formulations to clear and clean paint deposits from surfaces. In some examples, the paint deposits may be spray paint deposits on concrete, brick and metal surfaces amongst others. In some examples, the formulations may include active salt agents comprising molybdenum and aluminum cations.

5 Claims, 2 Drawing Sheets

```
110  ──▶ Obtain a Fatty Acid Stock

120  ──▶ Saponify a Portion of the Fatty Acid Stock In
         Sodium Hydroxide to Form a Sodium Fatty Acid
         Salt 130  ──▶ Saponify a Portion of the Fatty Acid Stock In
         Potassium Hydroxide to Form a Potassium Fatty
         Acid Salt 140  ──▶ React an Aluminum Salt with the Sodium Fatty
         Acid Salt 150  ──▶ React an Molybdenum Salt with the Potassium
         Fatty Acid Salt 160  ──▶ Cool reaction products of step 140 and 150 and
         separate water phase and discard 170  ──▶ Mix cooled reaction products with heating and cool
         to result in paint removal formulation
```

Fig. 1

METHODS AND FORMULATIONS FOR PAINT DEPOSIT REMOVAL

CROSS REFERENCE TO RELATED APPLICATIONS

This application claims the benefit of the U.S. Provisional Patent Application 62/820,936 filed Mar. 20, 2019. The contents of this Provisional Patent application are hereby incorporated by reference in their entirety.

FIELD OF THE DISCLOSURE

The present disclosure relates to formulations and methods for liquid solutions that have properties that facilitate the removal of paint from various types of surfaces. In some specific examples, the liquid solutions are formulated for effective removal of commercially available spray paints from surfaces.

BACKGROUND OF THE DISCLOSURE

There may be various reasons that a surface may have a layer or deposit of paint material upon it that is undesired, such as the presence of an aged painted layer or the presence of graffiti. There are formulations and processing procedures that have been developed over the years to remove such paint deposits, but they may typically involve the use of caustic and hazardous materials or the treatment of the surface with abrasive materials that may incompletely remove the paint deposits but also render the surface finish differently from other non-treated regions of the surface.

It may be very desirable to have formulations, and methods of using these formulations, that do not involve the use of hazardous chemicals or abrasive materials with associated equipment requirements. It would be further desirable if the formulations would be cost efficient, and would work on as many different surface materials as practical.

SUMMARY OF THE DISCLOSURE

Accordingly, the present invention provides non-hazardous liquid formulations that are safely usable and affordable for the purpose of removing spray paint from multiple mediums. Steel and concrete are common construction mediums that regularly see defacing by spray paint in the form of graffiti. As has been discussed the state-of-the-art removal may typically involve process that is expensive, tedious, and time-consuming.

The category of formulations as described herein that are non-hazardous, affordable, easy to use, and do not degrade the structural integrity of the mediums to which they are applied afford benefit to businesses and communities alike for multiple purposes.

A formulation may be formed for removal of paint deposits. The formulation may comprise a fatty acid salt with molybdenum as a cation, and a fatty acid salt with aluminum as a cation. The initial formulation may have a ratio of the molybdenum salt to the aluminum salt is roughly 3:1. The initial formulation may have an additional natural oil added. The initial formulation may have an additional synthetic oil added. The initial formulation may have an additional surfactant added. The initial formulation may have an additional abrasive added.

There may be numerous methods of creating formulations for paint removal. In an exemplary method, a formulation for paint removal may comprise the following steps: obtaining a stock of fatty acid; saponifying a portion of the stock of fatty acid with sodium hydroxide; cooling the resulting mixture from the saponification with sodium hydroxide; separating and isolating the sodium fatty acid salt phase; reacting the sodium fatty acid salt phase with aluminum chloride; saponifying another portion of the stock of fatty acid with potassium hydroxide; cooling the resulting mixture from the saponification with potassium hydroxide; separating and isolating the potassium fatty acid salt phase; reacting the sodium fatty acid salt phase with the product of Molybdenum Disulfide reaction in sulfuric acid; and mixing the aluminum fatty acid salt phase with the molybdenum fatty acid salt phase. In some examples, an oil may be added. In some examples a surfactant may be added to the formulation.

There may be numerous methods of utilizing formulations for paint removal. In an exemplary method, the method may include the steps of: obtaining a formulation wherein the formulation comprises at least a molybdenum acid salt; applying the formulation to a paint deposit upon a surface; allowing the formulation to sit on the paint surface; and rinsing the deposit with a water solution.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 1 illustrates exemplary method steps for creating a paint removal formulation.

DETAILED DESCRIPTION

Figure 2:
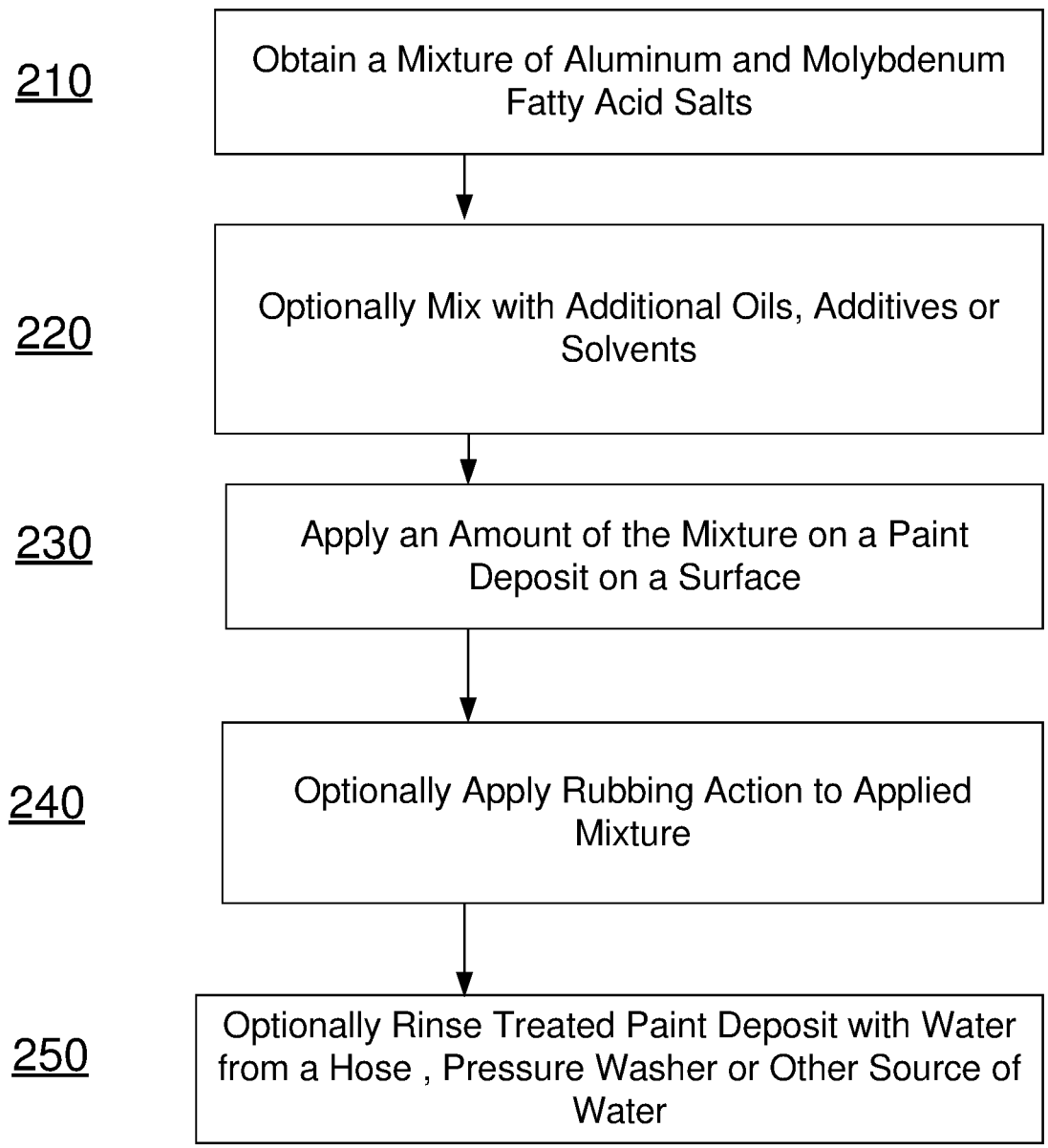
FIG. 2 illustrates exemplary usage of paint removal formulations.

The present disclosure provides generally for non-hazardous liquid formulations that are safely usable and affordable for the purpose of removing spray paint from multiple mediums. According to the present disclosure, a combination of an oil and compounds containing metal cations, in preferred embodiments where the metal is molybdenum, are formed which when applied to a paint deposit remove said deposit by effecting the cohesive forces of the deposit caused by binders in the paint formulations as well as decreasing the binding effectiveness of the paint deposit to the surface underlying. General methods of applying such formulations to various surface including concrete, wood, plastic, and metal surfaces to mention some non-limiting examples are provided hereafter. The methods of creating usable products of the formulation and exemplary results from different methods are also included herein.

In the following sections, detailed descriptions of examples and methods of the disclosure will be given. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

In some examples, an effective and efficient means to remove a paint deposit may derive from focusing on specific aspects of the general chemical and physical characteristics of typical paints, and particularly for typical spray paints. In general, a content formulation contained in a can of spray paint, also called aerosol paint, may be formulated with three basic constituents. These may be a propellant, a paint formulation, and a binder. The propellant, or aerosol, is a gas phase chemical that transports the liquid contents out of the can. In general, the propellant may be a non-influential component when it comes to binding a paint to a surface.

The paint formulation may itself include various constituents including pigments, solvents, fillers, surfactants and other additives. Generally speaking, the solvent portions of a formulation also may generally be non-influential components when it comes to binding to a surface. The third general constituent mentioned above, the binder, may sometimes be considered as a component of a paint formulation itself after it is mixed into the formulation. Nevertheless, from a bonding perspective, the binder may be important to consider in isolation since it generally imparts the film binding characteristics of an applied paint.

Generally speaking, the binder may be the main component by mass of a dried paint deposit. In isolation, typical molecules used as resins or binders are generally poor binders to many surface layers as they typically may be hydrophobic materials (meaning repulsive to water) that poorly "wet" surfaces that have water content or have the ability to be wet by water (i.e. are hydrophilic). In some cases, these properties are why it is important for strong adhesion of a spray paint to a surface that the surface be dry to give the paint formulation the best chance of spreading out on the surface as it begins to dry, and its solvent evaporates. Generally speaking, binders and spray paint may be hydrophobic.

The adhesion of binders to surfaces may be a function of numerous aspects. An important promotor for bonding may be the increase in texture of a surface. The higher the texture of a surface the higher its effective surface area is per unit area of a flat surface. The adhesion of paints sprayed on surfaces tend to be stronger on surfaces with texture because these mediums, like concrete, have a greater surface area due to their porous content. The greater the surface area is the stronger the adhesion of the binder tends to be. Concomitantly, removal of paints sprayed on such high areas surfaces is more complex and it is more difficult to combat the absorption of the paint onto the surface.

This adhesion of paint to surface may involve covalent chemical bonds across the surface interface when the formulation of the paint or a primer of the paint uses chemical coupling agents which are adhesion promoters. One of the theories used to explain bonding between adhesives and substrates is the mechanical theory of adhesion which models adhesion to occur by the penetration of adhesives into pores, cavities, and other surface topography features of the surface of the substrate or adherend. By utilizing this mechanical theory of adhesion and by manipulating formulations based on the qualities of spray paint binders, a simple solution may be formulated to break these binders from surfaces for complete removal of paint without degrading the structural integrity of the mediums below the paint deposit.

In some examples, a desired mechanism to activate with formulations of paint remover as discussed here may come from a focus on lowering the surface energy of the surface below the spray paint, breaking the cohesive forces of its binders and minimizing the tensile stress of the substrate surface for efficient removal. In study, research has shown that an effective solution to complete these three aspects involves the use of non-petroleum-based oils. which may have the property of creating a smooth surface to lower surface energy. The oils may also affect the nature and quality of cohesive forces of the binder. As a first step in a process of removing paint depositions, a treating agent comprising these oils may first begin by alleviating the stress of the binding surface. This may begin the process of removal.

A secondary goal of removing the paint may be to completely remove the paint in a non-intrusive manner. thus, leaving the surface unharmed. In order to complete the operation of removal it is necessary to remove contaminants from the surface by the use of cleaning. The combination of an oil and an agent commonly used for cleaning may be difficult. It has been shown that a combination of an oil with a cleaning agent may benefit from including a compound incorporating a metal compound. In some preferred examples, compounds incorporating molybdenum have been shown to be effective.

In a theoretical treatment, Molybdenum's effectiveness may derive from the fact that it is a strong cation of relatively high electronegativity which may allow compounds incorporating it to disrupt the binding coefficient of spray paint. Combining this metal with oils may enhance the efficiency of paint removal. In tests, Molybdenum binds to paint for easy removal and an oil phase of a compound thus formed with Molybdenum may remain as the transferring agent to the surface to reduce surface area energy and increase a hydrophobic surface quality. This layer of oil left behind as a residual may allow water to penetrate the paint and wedge between the paint and surface for easy removal, via pressure washer, manual effort, or merely as a natural removal from the action of rain, dew and other sources of water upon the surface.

There may be numerous types of natural oil that may combine with the various cations, and in preferred examples with molybdenum. In choosing preferred oils, it may be desirable to choose oils that are more stable over time so that their effect on the paint surface may be long acting. A principal mechanism of degradation of oils may be oxidation, when oxygen reacts with the oil molecule to create new degradation products. Oils with less susceptibility to oxygen may be desired.

A preferred choice may be natural beef tallow. Natural beef tallow is a naturally occurring, highly saturated, high fatty acid content oil. Beef tallow may also be easy to convert to an accessible ester which may act as an effective bonding receptor of molybdenum. Processing of beef tallow may require carefully controlled processing conditions to keep the tallow in a liquid phase since naturally derived samples may have a relatively large range of phase temperatures, with a freezing point and boiling point that are close to "room temperature" ~25 degrees centigrade.

An improvement may result by combining beef tallow with another natural oil. In some examples the second oil type may be coconut oil; a highly saturated oil stock. Coconut oil may be >90% saturated. Coconut oil shares a similar composition of fatty acid constituents with beef tallow as they both may contain similar fatty acid constituents such as in non-limiting example, caprylic acid, decanoic acid, lauric acid, myristic acid, palmitic acid, and oleic acid. Incorporation of coconut oil may improve characteristics of a solution of oils and molybdenum containing molecules.

In some examples, the fatty acids in coconut oil may both form a part of the oil phase of formulations of the present specification and it may also may form esters and bind molybdenum in molecules that are included in the liquid formulation. The introduction of coconut oil may also come with an added benefit of increasing the per capita of fatty acids per volume to the solution. In some examples, an addition of an amount of aluminum oxide may also be adjusted in the formulation which may help to maintain the surface after paint is removed from it.

In some examples, a combination of metallic esters will coat the surface area upon complete application allowing the release of metallic cations to bond with the spray paint. Natural oils will remain as a residual coating to protect the surface and the non-hazardous cations plus paint may be removed and discarded. The method of removal will be cost-effective, easily disposed, and environmentally friendly in the realm of graffiti removal.

Exemplary Processing Description

Preparation of Reactants:

The reaction of starting materials with each other may be processed in various ways to create intermediate reactants and final products of various kinds. Exemplary balanced equations for one or more of the reactions that may occur during the processing follow. It is understood that the process steps may produce a reaction as illustrated in these exemplary equations or another product or a combination of other products and the product of the illustrated reaction.

Aluminum oxide may be converted to aluminum chloride by reaction with dilute hot hydrochloric acid $$AL_2O_3+6HCI \rightarrow 2AlCl_3+3H_2O \quad A1)$$

Molybdenum disulfide may be converted to a dissolved salt by reaction with hot sulfuric acid.

$$MoS_2+2H_2SO_4 \rightarrow \text{Dissolved Molybdenum Salt} \quad A2)$$

Removal of Glycerin from Fatty Acid Containing Starting Material:

B1) Hydrolysis of coconut oil in sodium hydroxide (saponification) with heat:

$$\text{Fat}+NaOH \rightarrow \text{Glycerol}+\text{sodium salt of fatty acid}$$

B2) Hydrolysis of beef tallow in potassium hydroxide (saponification):

$$\text{Fat}+KOH \rightarrow \text{Glycerol}+\text{potassium salt of fatty acid}$$

Combination of Metal Cations with Salts of Fatty Acids

C1) Coconut fatty acid reaction with aluminum chloride salt with heat:

$$6Na\ (\text{Fatty Acid})+2AlCl_3 \rightarrow 2Al\ (\text{Fatty Acid})_3+6NaCl \text{ (exemplary mass balance)}$$

C2) Beef tallow fatty acid reaction with reacted/dissolved molybdenum sulfate salt with heat:

$$5\ K(\text{Fatty Acid})+\text{Dissolved Molybdenum Salt} \rightarrow Mo\ (\text{Fatty Acid})_5+\text{dissolved ions (exemplary mass balance)}$$

As has been discussed, exemplary formulations useful for removal of paint layers may be formed by combining one or more of the above solutions of complexed metal cations with fatty acid molecules into a liquid formulation which may have one or more oils added to complete the formulation. In some examples, a pure liquid formulation of either of the reaction, products may be used. In other examples a combination of the two reaction products may be used where the molybdenum fatty acid complex may be useful for reaction with paint binder layers, which may make them more permeable to the entry of oils also present in the formulation to interact with the binding surface of the paint layer on the substrate.

In some further exemplary formulations, a combination of one or more of the fatty acid complexed metal cations may be mixed with one or more oils. Other constituents may be added to the mixture for various purposes, for example various surfactants may be added to the formulation to enhance wetting of the mixture with a paint layer. In other examples, abrasive materials may be added to formulations to facilitate interaction of the formulations with the paint layer.

A cost effective and safe removal agent formulation may be formed with the use of natural oil stocks such as beef tallow or coconut oil, but purified constituent elements from other natural oils such as but not limited to Palmitic acid, Stearic acid, Myristic acid, Oleic acid, Palmitoleic acid, Linoleic acid, Linolenic acid, Caproic acid, Caprylic acid, capric acid, and lauric acid may be processed in similar ways to create effective formulations. There may be other chemicals which may complex with the metal cations that may be useful as additives or base materials such as EDTA as an example. Furthermore, fluorocarbon and chlorocarbon acids and esters may be used to create formulations.

A hydrophobic oil layer has an important role in formulations as have been described, the natural oils as discussed can play a cost effective and technically effective role. Nevertheless, similar compositions within the scope of the present disclosure may be formed with the addition of other oil formulations with hydrophobic compositions such as silicones, fluorinated oils and the like.

Exemplary Experimental Results

The exemplary processes may create and combines two forms of liquid soaps with metal cations to form a non-hazardous viscous solution that successfully removes spray paint and other types of paint deposits from multiple mediums (surfaces). The formulations may be effective with minimal effort. The use of saponification of fats and salt production of metal ions (cations) produces an electronegative oily soap solution that softly reacts with spray paint upon application. The interaction of the formulations with the paint deposits may facilitate a complete transfer of paint from medium to cation in solid phase for removal and disposal. The residual oil soap in solution with the aluminum cation may then seal the surface, while also cleaning remaining contaminants. The resulting interaction of the aluminum cation with the surface may preserve all original coverings or mediums that were located underneath the paint deposit.

Experimental testing—in the following sections exemplary processing which resulted in formulations which demonstrate effective removal of paint deposits are presented. The examples show the general effectiveness of the formulation concept but are not intended to limit the scope of the formulation concept or the applications of the formulations in anyway.

Working ranges of measurables—in the following sections measured quantities are described as exemplary settings to produce an effective result. The measured quantities are understood to have working ranges around the target settings. Some preferred embodiments may have operational set points that may vary by 5 degrees Celsius around targeted set points and result in an acceptable product. In some examples, temperatures may vary by 10 degrees Celsius and be operational, albeit with lowered yields or other degraded performance aspects. In a similar manner, volumes or masses may vary by up to 10% and be acceptable. Thus, processes that are specified within these ranges may be considered consistent with the present specification. In some examples, temperatures may be discussed as setpoints upon a piece of equipment, such as a temperature setting on a hotplate, it may be understood that a setpoint on a piece of equipment may be controlled for a consistent processing aspect, but may not be the temperature (or other measurable aspect) of the chemicals that the equipment is processing.

Exemplary Materials—in the following sections a number of the materials employed may be as described below, alternative supplies may be expected to yield similar results.

Sodium Hydroxide—99% pure sodium hydroxide (Lye) beads as available from FactoryDirectChemicals.com has been used for processes describing sodium hydroxide.

Potassium Hydroxide—potassium hydroxide flakes (anhydrous potash) as available from FactoryDirectChemicals.com has been used for processes describing potassium hydroxide.

Hydrochloric Acid—full strength food codex grade muriatic acid (31.45% hydrochloric acid) as available from Brenntag Mid-south, Inc. has been used for processes describing hydrochloric acid.

Sulfuric Acid—fume free sulfuric acid (38% sulfuric acid) as available from Brenntag Mid-south, Inc. has been used for processes describing sulfuric acid.

Coconut Oil—Organic Coconut cooking oil without flavorings as available from Carrington Farms has been used for processes describing Coconut oil.

Beef Tallow—100% Beef Tallow as available from US Dreams has been used for processes describing Beef Tallow.

Water—Distilled water as available from Crystal Springs Inc. has been used for processes describing water.

Molybdenum Disulfide—1.5 micron, 99% pure ACS Reagent Grade Molybdenum Disulfide fine powder ($MoS_2$) as available from Eisen Golden Laboratories has been used for processes describing molybdenum disulfide.

Aluminum Oxide—pure 220 grit aluminum oxide as available from Pure Organic Chemicals Inc. has been used for processes describing aluminum oxide.

Example 1

Example 1—Part A

In a first main step, "Part A" 100 mL of coconut oil was added to a beaker and then placed on hot plate at elevated temperature. In the experiment the temperature was set at 50° C. (122° F.), but other elevated temperatures may be used. The heating was conducted with mechanical stirring.

Next, in a second beaker, 300 mL of H2O (water) was added to the beaker and placed on a second hot plate. In the experiment, this temperature was also set to 50° C. (122° F.). The heating again occurred with mechanical stirring with a magnetic stir bar. To the beaker, 44.3 mL (or 3 level tablespoons) equal to approximately 94 g of sodium hydroxide was slowly added, and the solution was allowed to mix thoroughly on heat until the sodium hydroxide was completely dissolved.

Next, the solution of the first beaker was added to the contents of the second beaker, while heating to 50° C. (122° F.) and mechanical stirring still occurred. The mixture was mixed for approximately an hour, and then the first beaker was allowed to cool down. As the liquid cooled a separation occurred.

After the first beaker was cooled and the contents were separated into multiple phases, the contents were poured into a teardrop beaker. The initially separated contents were then allowed to separate further. A clear phase, consisting primarily of glycerol and an opaque layer comprising the fatty acid molecules was observed.

Next these two phases were segregated into separate containers and allowed to sit with coverings at ambient conditions.

Example 1—Part B

In a second main step, "Part B" 100 mL of 100% beef tallow (grass fed) was placed into a third beaker and placed upon a hot plate at 50° C. (122° F.) with mechanical stirring.

Next in a fourth beaker 300 mL of water was added and placed on a second hot plate set to a temperature of 50° C. (122° F.). The solution was mechanically stirred with a magnetic stirring bar while 39.4 mL (3 level tablespoons) of potassium hydroxide weighing approximately 83.5 g were slowly added to the fourth beaker. The resulting mixture was allowed to continue thoroughly mixing while being heated until all of the reactants went into solution and no sediment was observed.

When completed, the contents of the fourth beaker were added to the contents of the third beaker while being further stirred and heated. The resulting mixture was allowed to stir with heating for one hour.

Next the resulting mixture was allowed to cool down and separate into multiple phases. The contents were then pored into a teardrop beaker and allowed to separate again. Again, there was a clear phase, comprising mostly glycerol and an opaque phase comprising the fatty acid molecules.

Example 1—Part C

A third main step, "Part C" was then begun by pouring 300 mL of sulfuric acid into a fifth beaker. The beaker was placed on a hot plate at 50° C. (122° F.) and mechanically stirred.

Next the sulfuric acid was heated until it reached a stable temp of approximately 50° C. (122° F.)—while controlling the stirring to create a vortex stir. Next, molybdenum (Mo) as molybdenum disulfide was slowly added to the solution. After each addition of 2.5 mL (½ teaspoon) or approximately 12.7 g, the solution was allowed to mix until the molybdenum disulfide was dissolved. The equivalent of 15 mL (3 level teaspoons) weighing approximately 76 g was added in this manner.

Next, the solution was mixed while being heated for 30 minutes.

The results of the second main step "Part B" were now put on a second hot plate to heat up to approximately 51.5° C. (125° F.).

As soon as the results of "Part B" reached a stable 51.5° C. (125° F.) while being stirred, they were processed in this manner for 30 minutes. The results of "Part C" were then added into "Part B" slowly and let stir on heat for 20 minutes.

The resulting mixture was allowed to cool and separate and a clear liquid separated. The clear liquid comprised mostly water. This clear liquid was discarded leaving the molybdenum bonded fatty acid mixture remaining. When the remaining liquid was cooled it solidified.

Example 1—Part D

A sixth beaker was next filled with 300 mL of Hydrochloric acid and the solution was placed on a hot plate with stirring while the temperature was set at 51.5° C. (125° F.).

Once the hydrochloric acid reached a stable 51.5° C. (125° F.), 2.5 mL (half a teaspoon) of $Al_2O_3$ weighing approximately 9.9 g was slowly added into the acid so that it dissolved. The mixture was left on the hot plate with heat and mechanically stirred for 30 minutes.

After 30 minutes, the $Al_2O_3$ (aluminum oxide) that did not dissolve was filtered out and the filtrate was then put back onto hot plate for an additional 10 minutes.

In the meantime, the results of "Part A" were placed on another hot plate set at 51.5° C. (125° F.) with stirred with mechanical stirring. The solution was stirred on the hot plate until it reached a stable 51.5° C. (125° F.) temperature.

As soon as "Part A" reached a stable 51.5° C. (125° F.), it was added into "Part D". The resulting mixture was kept on a hot plate at 51.5° C. (125° F.)F with mechanical stir for 30 minutes. The dissolved aluminum cations bonded to the fatty acid chain of part A. The mixture then separated into a clear liquid and an opaque phase. The clear liquid, mostly water, was discarded. The remaining phase was allowed to cool. The cooled result of "Part D" remains as a liquid.

Example 1—Part E

Next the solid form result from "Part C" was melted in a beaker on a hot plate at 51.5° C. (125° F.) and brought to a stable temperature. When the material had fully melted and reached the stable temperature, it was added to the result of "Part D" and mixed thoroughly at 125° F. for 20 minutes. The resulting mixture was cooled and remained in a liquid form.

Example 2

Example 2—Part A

In a first main step, "Part A" 300 mL of water was added to a beaker and then placed on hot plate with stirring capability. Without heat, the water was stirred enough to create a good vortex in the beaker. In further processing, 44.3 mL (or 3 level tablespoons) equal to approximately 94 g of sodium hydroxide was added to the water while the solution continues to stir. The heat of dilution of the sodium hydroxide elevated the temperature of the solution. The solution was stirred until the sodium hydroxide was fully dissolved and the temperature reached a temperature in a range of approximately 27° C. (80° F.) to 29° C. (85° F.).

In a second beaker, a volume of 100 ml of coconut oil was added and allowed to sit while the first beaker reached the temperature in the range of approximately 27° C. (80° F.) to 29° C. (85° F.). At that point the contents of the second beaker may be added into the first beaker and allowed to continue stirring for one hour. This processing caused the oil solution to yield a product of medium chain triglycerides ("MCT") as the sodium hydroxide interacted with the coconut oil. After an hour of stirring, the solution was allowed to sit for approximately 30 minutes to separate. The solution separated into two phases, a top layer a clear liquid of glycerol and a lower opaque layer of MCT. The solutions were separated and the MCT was placed into a third beaker.

In a fourth beaker, a volume of 150 ml of water and 150 ml of sulfuric acid was mixed and then placed on a hot plate set for heating at 57° C. (135° F.). The solution was stirred with a magnetic stirrer until the solution reached a temperature of approximately 57° C. (135° F.). A quantity of 2.5 mL (half a teaspoon) of $Al_2O_3$ weighing approximately 9.9 g (also called Aluminum Oxide—$Al_2O_3$) powder was added to the fourth beaker and allowed to stir under heating for approximately forty five minutes to dissolve the aluminum oxide. During the forty five minute period, water was added to maintain the volume of the solution at 300 ml. After forty five minutes the heat was turned off allowing the solution to cool. The solution was allowed to cool until it reached approximately 27° C. (80° F.) to 29° C. (85° F.).

When the solution in the fourth beaker reached approximately 27° C. (80° F.) to 29° C. (85° F.) the contents of the third beaker (the MCT) was added to the fourth beaker and allowed to stir for thirty minutes. After the thirty minutes, the stirring was halted and the solution was allowed to sit and separate. When the contents fully or near fully separated the two phase solution had a bottom clear aqueous phase and a top opaque phase. The top opaque phase contained a product resulting from reaction of the Aluminum Oxide and the MCT which was separated from the aqueous phase. The top opaque layer was poured into a fifth beaker.

Example 2—Part B

In a first main step of "Part B" 300 mL of water was added to a first beaker and then placed on hot plate with stirring capability. The water was stirred without heating and 44.3 mL (or 3 level tablespoons) equal to approximately 94 g of potassium hydroxide were added. Next, the hotplate was adjusted to a setpoint of 49° C. (120° F.). The solution was stirred for thirty minutes to dissolve all of the added potassium hydroxide flakes.

In a second beaker, 100 ml of beef tallow (in this example, grass fed beef tallow) was placed into a second beaker on a second hotplate. The hotplate was set to 49° C. (120° F.) and the beef tallow was melted and warmed to 49° C. (120° F.) for a period of approximately 10 minutes.

The contents of the Part B second beaker was added to the Part B first beaker while the first beaker resided on its hotplate at a setting of 49° C. (120° F.).

The contents of the first beaker was allowed to stir on the hotplate for a period of an hour. After that period, the contents were removed from the hotplate and allowed to cool and separate. The top phase was an opaque phase including additional MCT from the tallow and the bottom portion was a clear solution including glycerol. The phases were separated into two separate beakers.

The beaker with the MCT tallow phase (approximately a volume of 100 ml) was placed on a warm hotplate. A volume of 100 ml of water was added to the beaker which turned the solution into an opaque viscous solution. The beaker was then removed from the hotplate and allowed to cool and sit to allow phases to separate. This prepared the MCT Tallow phase for further processing. The water phase was removed leaving the tallow in the third beaker.

A fourth beaker was used to contain 150 mL of water and 150 mL of $H_2SO_4$. This mixture was placed upon a hot plate at approximately 54° C. (130° F.) with stirring. To the mixture an amount of 15 mL (3 level teaspoons) weighing approximately 76 g molybdenum disulfide was allowed to dissolve into the liquid phase. As soon as the molybdenum disulfide was completely dissolved the contents of the third beaker were added to this fourth beaker and allowed to stir with heating at approximately 54° C. (130° F.) for twenty minutes.

After the 20 minutes is completed, the contents of the beaker were allowed to separate. The resulting top phase contained a reaction product of the MCT Tallow with the molybdenum disulfide. The bottom phase was a clear acidic aqueous phase. The top phase was separated and poured into a fifth beaker as a product of this example 2 part B.

Example 2—Part C

The fifth beaker from Part A was placed on a hotplate with stirring and brought to a temperature of approximately 43°

C. (110° F.). The contents of the fifth beaker from Part B was slowly added to the fifth beaker from Part A and then allowed to stir with heating for 30 minutes to become an homogeneous mixture. After 30 minutes of mixing, the mixture was removed from the heating and allowed to cool to room temperature. This resulted in a product.

Example 3

Example 3—Part A

Another example of processing (Example 3) follows.

In a first main step, "Part A" 300 mL of water is added to a beaker and then placed on hot plate with stirring capability. Without heat, the water may be stirred enough to create a good vortex in the beaker. In further processing, 44.3 mL (or 3 level tablespoons) equal to approximately 94 g of sodium hydroxide was added to the water while the solution continues to stir. The heat of dilution of the sodium hydroxide elevated the temperature of the solution. The solution was stirred until the sodium hydroxide fully dissolved and the temperature reached a temperature in a range of approximately 27° C. (80° F.) to 29° C. (85° F.).

In a second beaker, a volume of 100 ml of coconut oil was added and allowed to sit while the first beaker reaches the temperature in the range of approximately 27° C. (80° F.) to 29° C. (85° F.). At that point the contents of the second beaker were added into the first beaker and allowed to continue stirring for one hour. The processing caused the oil solution to yield a product of medium chain triglycerides ("MCT") as the sodium hydroxide interacted with the coconut oil. After an hour of stirring, the solution was allowed to sit for approximately 30 minutes to separate. The solution separated into two phases, a top layer a clear liquid of glycerol and a lower opaque layer of MCT. The solutions were separated and the MCT was placed into a third beaker.

In a fourth beaker, a volume of 300 ml of water was placed on a hot plate. The solution was stirred with a magnetic stirrer until the solution reached a temperature of approximately 57° C. (135° F.). A quantity of 44.3 mL (or 3 level tablespoons) equal to approximately 94 g of sodium hydroxide was added to the heated water and allowed to fully dissolve. When the temperature reached 57° C. (135° F.) and the sodium hydroxide fully dissolved, a quantity of 2.5 mL (half a teaspoon) of $Al_2O_3$ weighing approximately 9.9 g (also called Aluminum Oxide—$Al_2O_3$) powder was added to the fourth beaker and allowed to stir under heating for approximately forty five minutes to dissolve the $Al_2O_3$. During the forty five minute period, water was added to maintain the volume of the solution at 300 ml. After forty five minutes the heat was turned off allowing the solution to cool. The solution was allowed to cool until it reached approximately 27° C. (80° F.) to 29° C. (85° F.).

When the solution in the fourth beaker reached approximately 27° C. (80° F.) to 29° C. (85° F.) the contents of the third beaker (the MCT) was added to the fourth beaker and allowed to stir for thirty minutes. After the thirty minutes the stirring was halted and the solution was allowed to sit and separate. When the contents fully or near fully separated, the two phases were a bottom clear aqueous phase and a top opaque phase. The top opaque phase contained a product resulting from reaction of the aluminum oxide and the MCT which was separated from the aqueous phase. The top opaque layer was poured into a fifth beaker.

Example 3—Part B

In a first main step of Example 3 "Part B," 300 mL of water was added to a first beaker and then placed on hot plate with stirring capability. The water was stirred without heating and 44.3 mL (or 3 level tablespoons) equal to approximately 94 g of potassium hydroxide were added. Next, the hotplate was adjusted to a setpoint of 49° C. (120° F.). The solution was stirred for thirty minutes to dissolve all of the added potassium hydroxide flakes.

In a second beaker, 100 ml of beef tallow (in this example, grass fed beef tallow) was placed into a second beaker on a second hotplate. The hotplate was set to 49° C. (120° F.) and the beef tallow was melted and warmed to 49° C. (120° F.) for a period of approximately 10 minutes.

The contents of the Part B second beaker was added to the Part B first beaker while the first beaker resided on its hotplate at a setting of 49° C. (120° F.).

The contents of the first beaker was allowed to stir on the hotplate for a period of an hour. After that period, the contents were removed from the hotplate and allowed to cool and separate. The top phase was an opaque phase including additional MCT from the tallow and the bottom portion was a clear solution including glycerol. The phases were separated into two separate beakers.

The beaker with the MCT tallow phase (approximately a volume of 100 ml) was placed on a warm hotplate. A volume of 100 ml of water was added to the beaker which turned the solution into an opaque viscous solution. The beaker was then removed from the hotplate and allowed to cool and sit to allow phases to separate. This prepared the MCT Tallow phase for further processing. The water phase was removed leaving the tallow in the third beaker.

A fourth beaker was used to contain 150 mL of water and 150 mL of $H_2SO_4$. This mixture was placed upon a hot plate at approximately 54° C. (130° F.) with stirring. To the mixture an amount of 15 mL (3 level teaspoons) weighing approximately 76 g molybdenum disulfide was allowed to dissolve into the liquid phase. As soon as the molybdenum disulfide was completely dissolved the contents of the third beaker were added to this fourth beaker and allowed to stir with heating at approximately 54° C. (130° F.) for twenty minutes.

After the 20 minutes was completed, the contents of the beaker we allowed to separate. The resulting top phase contained a reaction product of the MCT Tallow with the molybdenum disulfide. The bottom phase was a clear acidic aqueous phase. The top phase was separated and poured into a fifth beaker as a product of this example 3 part B.

Example 3—Part C

The fifth beaker from Part A was placed on a hotplate with stirring and brought to a temperature of approximately 43° C. (110° F.). The contents of the fifth beaker from Part B was slowly added to the fifth beaker from Part A and then allowed to stir with heating for 30 minutes to become an homogeneous mixture. After 30 minutes of mixing, the mixture was removed from the heating and allowed to cool to room temperature. This resulted in a product.

Aluminum Oxide General Processing

In preparing an aluminum salt reagent a number of processing examples have been practiced. In the various examples described previously, the use of different processing to dissolve aluminum oxide powder have been practiced. Hydrochloric acid is effective in dissolving aluminum oxide powder. Alternatively, another acid based process with Sulfuric acid is also effective. In a preferred manner, hot sodium hydroxide may be used to dissolve the aluminum oxide. In full processing examples for the product, it has been observed that any of these methods may be substituted for another for the process step of creating the aluminum salt reagent.

General Processing Flow Example

Referring to FIG. 1, a generic illustration of the method steps as experimented with and as within the scope of the current disclosure is provided. At step 110, a stock of a fatty acid material or of fatty acid materials may be obtained. At step 120, a portion of the fatty acid stock may be reacted with sodium hydroxide or other basic compounds with cations such as sodium or potassium. The reaction byproducts may separate into different phases and the fatty acid salt mixture phase may be isolated. At step 130, another portion of the fatty acid stock may be reacted with potassium hydroxide or other basic compounds with cations such as potassium. The reaction byproducts may separate into different phases and the fatty acid salt mixture phase may be isolated. At step 140, the sodium fatty acid salt mixture may be reacted with an aluminum salt mixture, such as aluminum chloride. At step 150, the potassium fatty acid salt mixture may be reacted with the molybdenum salt mixture. At step 160, the reaction by products may be cooled and aqueous phases that separate out may be removed. In some examples, one of the reaction products may solidify at reduced temperature. At step 170, the individual products after cooling may be combined and heated to create a mixture. In some examples, additional materials such as oils, surfactants, emulsifiers, and other additives to maintain freshness for example may be added.

Methods of Use

The resulting organic liquids from the different exemplary processing flows were applied to paint deposits on various surfaces such as brick and metal and removed paint from the surfaces by application and subsequent washing.

Referring to FIG. 2 a generic use of the paint removal formulation is shown in method steps. At step 210, a formulation containing at least a molybdenum fatty acid component may be obtained. In some examples, an aluminum containing fatty acid component may also be included in the formulation. At step 220, in some optional examples, the formulation may be mixed with added oils. At step 230, a user may apply an amount of the formulation to a paint deposit. In some specific examples, the paint deposit may be a spray paint deposit upon a brick surface or upon a metal surface. At step 240, the user may apply a rubbing action to the deposit with the formulation. After a period of dwelling, at step 250, the user may apply water to the deposit to rinse the removed deposit from the surface. In some examples, water may be pored onto the surface, in further examples a pressurized hose may be used to spray the surface and in still further examples a pressure washer may be used.

There may be other alterations to the previous exemplary methods that may be employed with the products as have been described. In some examples before the surface is treated with the products it may be wiped clean of surface dirt or deposits or washed clean with a cleansing solution. The product may settle during storage and may, therefore, need to be shaken or stirred for a few minutes, such as two minutes. The mixed product may be used in normal methods at full strength. Some methods for dilution may result in decomposition of the product.

The application of the product may be optimally performed as a uniform application. This application may be performed with a foam brush, a paint brush or a pump sprayer.

In many examples, the product may be most effective if allowed to penetrate a surface it is applied on for 24 hours to lift the spray paint from the surface. However, different surface types may require less or more time to penetrate the material such as paint upon the surface, but in general the longer the product is applied the better the result. In some examples, a second coat of the product may be applied to achieve desired results.

After the product has penetrated for the desired time the surface may be cleaned. There may be different optimal further method steps for different types of surfaces. For example, for metal surface the penetrated deposit may be wiped clean using a terry cloth. A wipe and fold technique with the terry cloth may ensure effective results.

For concrete surfaces, a pressure washer may be used to clean the surface. In some examples, the pressure washer may operate with a minimum PSI of 2200 lbs/square inch for the most effective cleaning. An effective method step with the pressure washer may be to move the wand slowly in a back and forth motion close to the surface to ensure the spray paint remover results.

The various tools used in the methods as have been described may be cleaned up with water and clean rags. A little bit of dish soap or an equivalent may be used to clean the tools that may have come into contact with the spray paint remover.

The formulations may be described as a single homogeneous mixture of an aluminum based phase and a molybdenum based phase that have been combined with processing as described previously. In some examples, however, there may be methods to use the product as a two phase product where the product is mixed together prior to application. In other examples, the two separate components may be applied in separate applications of the aluminum based phase and the molybdenum based phase.

After paint removal from a surface, the surface may subsequently be further cleaned after using the product to remove paint. In some examples, the surface may be power washed after application. In some examples, a detergent may be used to wash the surface after application.

In other examples, it may be desirable to leave the surface as is after the paint has been removed. The resulting surface without cleaning may retain an aspect of deterring the bonding of paint to the surface and the surface does not adhere well.

In related examples, a fresh or clean surface may be treated with the product to modify the surface in such a manner that it may repel paint from being applied or make a subsequent deposit easier to remove.

There may be a number of additives that may be added to the product during the previously mentioned processing steps or after the product has been formed. For example, it may be desired to adjust the pH of the product. Buffering agents, such as in a non-limiting example bicarbonate salts may be added to the product or during the production to modify the resulting pH of the product. In other examples, fragrance additives may be added to the product or during the processing. In general for any of the methods of forming the product, additional materials such as oils, surfactants, emulsifiers, and other additives for various purposes including to maintain freshness, may be added.

In some descriptions of the methods, reference has been made to the removal of paint deposits from surfaces. The product may have other uses such as acting as a cleaner of various surfaces such as various surfaces of a bathroom. In some other examples, the product may be used to clean stains from surfaces such as removing iron stains from a surface. In a non-limiting example, an iron deposit on a stone, ceramic or metallic surface may be treated with the product, and result with the iron deposit being cleaned off of the surface. And, a fresh or clean surface may be treated with the product to make easier a subsequent cleaning of deposits or stains that occur on the treated surface. In some examples, the product may provide a metallic surface that it is applied to a protection against oxidation by the surrounding air.

The product may also be used to clean surfaces that have growth or weathering effects upon a metallic or masonry surface. In a non-limiting example a gutter may be stained with mold or the effects of a mold exposure. The stains may be either biologic materials or inorganic materials. An application of the product, in some examples at full strength, may facilitate the cleaning of the gutter surfaces.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

In the previous sections, detailed descriptions of examples and methods of the invention have been given. The description of both preferred and alternative examples are exemplary only, and it is understood that to those skilled in the art that variations, modifications and alterations may be apparent. It is, therefore, to be understood that the examples do not limit the broadness of the aspects of the underlying invention as defined by the claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method of preparing a formulation for removal of a paint deposit, the method comprising:
    obtaining a first stock of fatty acid;
    saponifying the first stock of fatty acid with one of sodium hydroxide and potassium hydroxide;
    cooling the resulting mixture from the saponification with the one of sodium hydroxide and potassium hydroxide;
    separating and isolating the first fatty acid salt phase;
    dissolving an amount of aluminum oxide into an aqueous solution by reaction of the amount of aluminum oxide with either a first strong acid or a first strong base to create a dissolved aluminum salt;
    reacting the first fatty acid salt phase with the dissolved aluminum salt to create an aluminum fatty acid salt phase;
    obtaining a second stock of fatty acid;
    saponifying the second stock of fatty acid with one of sodium hydroxide and potassium hydroxide;
    cooling the resulting mixture from the saponification with the one of sodium hydroxide and potassium hydroxide;
    separating and isolating the second fatty acid salt phase;
    dissolving an amount of molybdenum disulfide into an aqueous solution by reaction of the amount of molybdenum disulfide with a second strong acid to create a dissolved molybdenum salt;
    reacting the second fatty acid salt phase with the dissolved molybdenum salt to create a molybdenum fatty acid salt phase; and
    mixing the aluminum fatty acid salt phase with the molybdenum fatty acid salt phase.

2. The method of claim 1 wherein the first fatty acid stock is one of Beef Tallow and Coconut oil.

3. The method of claim 1 wherein the second fatty acid stock is one of Beef Tallow and Coconut oil.

4. The method of claim 1 wherein the aluminum oxide is dissolved with sodium hydroxide.

5. The method of claim 1 wherein the paint deposit was formed by a spray paint can.

\* \* \* \* \*